3,211,626
NEUTRONIC REACTOR FUEL ELEMENT
AND MEMBER THEREFOR
Marc A. Nerenstone and Telesphore L. Charland, Penn Hills, Pa., assignors to Westinghouse Electric Corporation, East Pittsburgh, Pa., a corporation of Pennsylvania
Filed Dec. 3, 1959, Ser. No. 856,992
5 Claims. (Cl. 176—73)

The present invention relates to a fuel element for use in a neutronic reactor and more particularly to a fuel element having means associated therewith for increasing the heat transfer capability of the fuel element and a process for making the same.

The fuel element disclosed herein is adapted for use in a neutronic reactor wherein a quantity of one or more of the fissionable isotopes $U^{233}$, $U^{235}$ and $Pu^{239}$ is caused to undergo a chain reaction. The chain reaction is propagated by neutrons having a specific range of velocities depending upon the type of reactor in which the fissionable material is employed.

In a thermal-type reactor the chain reaction is propagated by neutrons having velocities equivalent to thermally excited hydrogen ions or about 2500 meters per second. A neutronic reactor of this character usually employs the $U^{233}$ or $U^{235}$ isotopes or both of uranium to propagate the reaction. However, during the fissioning of each of these atoms, which, of course, results in two approximately equal fission fragments, an average of approximately three neutrons are expelled. However, most of these neutrons have velocities in the fast region or velocities exceeding 10,000 meters per second. Therefore, in order to propagate the chain reaction in a thermal reactor, it is necessary to employ a neutron-slowing material, termed a moderator, to slow the fast neutrons to the thermal velocity region. Suitable moderator materials are carbon, hydrogen, and deuterium, or materials containing these elements such as graphite, light water, deuterium oxide or heavy water, and radiation-stable organic materials, such as the multiphenyls.

The thermal type reactor may be constructed in the form of a lattice network of uranium or an alloy or compound thereof containing one of the fissionable isotopes and provided with coolant passages for the circulation of a suitable cooling medium such as water or carbon dioxide. Alternatively, the nuclear fuel material can be suspended in spaced relation in a pressurized vessel and light or heavy water can be utilized both as a cooling medium and as a moderator material, with suitable circulating loops being employed to maintain a flow of the moderator-coolant through the vessel to remove the heat developed by the chain reaction. Suitable heat exchanging means are disposed in the aforementioned circulating loops in order to convert into steam the water supplied to the heat exchanger from one or more secondary or thermodynamic loops.

As stated previously, the aforementioned coolant-moderator in certain applications, can be either light or heavy water with light water being the more efficient moderator material due to the lighter weight of the hydrogen nuclei. On the other hand, the use of heavy water is applicable in those cases wherein it is necessary to minimize the parasitic absorption of fissional neutrons within the reactor system as a result of peripheral and structural neutron losses. Heavy water is advantageous in this application in that it has a much smaller neutronic capture cross-section than light water.

The peripheral loss of neutrons from the chain reacting system is minimized by providing a neutronic reflector adjacent the periphery of the system or adjacent the inner walls of the containment vessel. This reflector can take the form of a layer of graphite disposed adjacent the walls of the vessel or of a water chamber or annular space usually reserved for this purpose between the outer periphery of the reactor core structure and the inner walls of the reactor vessel. When light or heavy water is employed as a coolant, this annular space, of course, is filled with the water and thus serves as a neutronic shield or reflector.

Another form of neutronic reactor is typified by the so-called epithermal reactor. In this reactor a quantity of at least one of the aforementioned fissionable isotopes are subjected to a chain reaction maintained by neutrons within the epithermal region, that is to say, neutrons having velocities between 2500 and 10,000 meters per second. In this form of reactor, the nuclear fuel or fissionable material is relatively closely spaced in order to lessen the moderating capacity of the moderator material. This form of reactor is particularly applicable for the fissioning of plutonium 239 which is fissionable only by neutrons in the higher velocity ranges.

Neutronic reactors are controlled by means of so-called control rods which are insertable through the reactor vessel into the reactor core. These control rods each contain a relatively good neutron-absorbing material, such as boron, hafnium, and gadolinium; and by variably absorbing the neutrons produced by the chain reaction, depending upon the position of the control rods relative to the reactor core, the propagation of the chain reaction to the reactor core, can be carefully controlled.

In any of the aforementioned basic reactor concepts, a fertile or "blanket" material such as uranium 238 or thorium 232, can be mixed or intermingled with the previously mentioned fissionable materials or otherwise disposed within the reactor vessel at positions adjacent to the fissionable isotope. The fertile materials, when thus used, absorb those neutrons which are not required for the propagation of the chain reaction and in doing so are transmuted into certain ones of the fissionable isotopes. For example, during neutronic radiation, atoms of the fertile material uranium 238 when employed are converted into the fissionable transuranic element plutonium 239 in accordance with the following nuclear equations:

with the times denoted in connection with the latter two reactions being the half-lives of the decaying isotopes. The plutonium 239 isotope is produced in either the thermal reactor wherein the initial core loading consists of natural or source-grade uranium, which may be enriched with one of the aforementioned fissionable isotopes or disposed adjacent to a quantity of the fissionable isotope in the form of a "seed"; or in the fast breeder type reactor wherein the initial core loading consists of natural uranium and a quantity of the plutonium 239 isotope.

On the other hand, the artificial fissionable isotope $U^{233}$ is obtained when thorium 232 is employed as the fertile or blanket material in a thermal or epithermal type reactor. The $U_{233}$ isotope is formed as a result of the following series of nuclear reactions:

the artificial fissionable isotope $U^{233}$ and the transuranic isotope $Pu^{239}$ have half-lives of 163,000 years and 24,000 years, respectively, and therefore are relatively stable in this respect.

The neutronic reactor reaches criticality when each succeeding generation of fissions of the chain reaction is exactly equal in number to that of the preceding generation. At this point the effective constant of criticality ($K_{eff.}$) is equal to unity and as a result, of the average of three neutrons yielded in each fission only approximately one of these neutrons is employed to propagate the chain reaction, and the remainder of the neutrons are absorbed by the aforementioned fertile materials by the moderator and coolant materials and by the structural components of the reactor system.

Control of neutronic reactors is made feasible by the phenomenon of delayed neutrons. It has been found that an average of about 2.8 to 2.9 of the 3.0 fission neutrons are emitted immediately upon fissioning of each chain-reacting atom. The delayed neutrons are emitted up to about 12 minutes after the fission process. Although only about 3 to 7% of the total neutrons emitted as a result of atomic fission are delayed neutrons, the time-margin provided by these delayed neutrons is sufficient to permit adjustment of the control rods to maintain the chain reaction approximately at the point of criticality during operation of the reactor. Otherwise, a tendency to an increase in the number of fissions from one generation to the next in the chain reaction would be multiplied almost instantaneously.

A more detailed description of the theory and operation of neutronic reactors are given in Patent Nos. 2,708,-656 and 2,798,847 issued May 17, 1955 and July 9, 1957 to Enrico Fermi and Leo Szilard, and entitled "Neutronic Reactor" and "Method of Operating a Neutronic Reactor," respectively.

Although the fuel element of the invention can be adapted for use in any of a wide variety of heterogeneous reactors employing ceramic or refractory fuels, an exemplary form of such reactor is described and claimed in a copending application of R. J. Creagan, entitled "Neutronic Reactor," filed September 27, 1957, Serial No. 686,778, now abandoned and assigned to the present assignee. When so used, a plurality of the fuel elements fabricated according to the invention can be joined together to form a fuel element assembly, for example, in the manner described and claimed in the copending application of Erling Frisch, entitled "Neutronic Reactor Fuel Element," filed March 17, 1958, Serial No. 721,775, now Patent 3,133,867, granted May 19, 1964, and assigned to the assignee of the present application. However, there are many known reactor systems and fuel element assemblies therefor, the details of which are readily available; and thus, a detailed description of such reactor or fuel element assembly herein is not necessary to the complete understanding of the present invention.

In order to support the fissile material and to confine the fissional products induced within the material during operation of the reactor, it is necessary to encase the fissile material within a suitable cladding or casing arrangement. When high temperature water or other pressurized corrosive coolant is employed in the reactor system, the casing or cladding material must, in addition, be formed from a corrosion resistant material having the necessary integrity to prevent contaminating the coolant stream with fissional products. However, the use of the cladding tube reduces the heat transfer capability of the fissile material particularly in the case of ceramic fuels, which when formed into the fuel elements are provided with radial clearances between the ceramic members comprising the fuel and the adjacent cladding tubes. Although these clearances are necessary to permit relative thermal expansion between the cladding tube and the ceramic fuel, the presence of the cladding tube and these clearances limit the maximum temperatures available at the surfaces of the fuel elements without exceeding the permissible operating temperature at the center of the ceramic members. If the permissible central operating temperature of the ceramic members is exceeded, the ceramic members will be unduly subjected to thermally induced stresses resulting in radial cracking, and moreover, the members may become molten along their central axes thereby stimulating the release of fissional products from the members. Of course, as long as the ceramic material can be maintained in its crystalline state the majority of the fissional products are substituted into the crystalline lattices thereby causing the fissional products to be confined within the ceramic members. Otherwise, the partial melting of the crystalline structure will release a substantial proportion of the fissional products in gaseous form, which can cause rupture of the fuel element cladding material.

In accordance with the invention, means are provided for reducing the radial temperature gradient of a ceramic fuel member without unduly affecting the neutron economy of the reactor system. It has frequently been suggested to mix a material of relatively better heat conductivity such as zirconium with the ceramic fuel material, such as uranium dioxide, so that the zirconium will substantially fill the porous structure of the ceramic material and thus increase the heat transfer coefficient thereof. However, this has not been found to be the case; while the formation of a cermet or ceramel in this fashion may increase the heat conductivity thereof at room temperature, a different result obtains under reactor operating conditions. The temperatures adjacent the central axis of the ceramic compacts at such time are in excess of 1000° C. In this temperature range, the transfer of heat through the ceramic fuel material is accomplished for the most part by thermal radiation. Consequently, the addition of an opaque heat conductive material into the pores of the ceramic would interfere with radiational transfer of such heat. Therefore, such cermet fuel material, as proposed heretofore, may have an equal or higher central operating temperature than an untreated ceramic fuel member.

Moreover, the central operating temperatures of the ceramic fuel material are in excess of the melting points of those metals which can be employed without deleteriously affecting the neutron economy of the reactor system. The presence of this molten material results in the formation of undesirable compounds between the conductive material and the ceramic material or in decomposition of the latter so that fissional products are more readily evolved from the central portion of the ceramic members. Moreover, the presence of the molten material and the formation of such compounds at the central portions of the ceramic members reduce the dimensional stability of the ceramic members as a result of the attendant phase changes.

Accordingly, an object of the present invention is to increase the thermal efficiency of a reactor fuel element.

Another object of the invention is to reduce the maximum operating temperature of the fuel element, that is to say, the temperature at axis or center of the fuel element.

A further object of the invention is the provision of a reactor fuel element having means associated therewith for promoting heat transfer by thermal radiation adjacent the central axis of the fuel element while improving heat transfer by conduction adjacent the outer heat transfer surfaces of the fuel element.

Another object of the invention is the provision of a process for fabricating the fuel element of the character described.

Still another object of the invention is the provision of a fuel element for a neutronic reactor having means incorporated therewith for decreasing the central operating temperature of a fuel element relative to its surface temperature, without decreasing the total thermal output of the fuel element.

A further object of the invention is to provide a new and improved nuclear fuel compact or member.

Another object of the invention is the provision of a ceramic fuel compact or member adapted for use in a reactor fuel element and having means for minimizing or preventing the escape of fissional products therefrom.

Another object of the invention is the provision of a reactor fuel element having means associated with the ceramic fuel material thereof for entraining fissional products within the ceramic material and for minimizing frictional contact between the ceramic material and the cladding tube employed therefor with the result that the thickness of the cladding tube can be reduced.

These and other objects, features and advantages of the invention will be made apparent during the ensuing description of exemplary forms thereof, with the description being taken in connection with the accompanying drawings, wherein:

From nuclear and physical considerations, fuel elements for many types of heterogeneous reactors desirably are fabricated with the fissionable material in the form of a ceramic material. For purposes of this description, "ceramic" is defined as denoting a high-melting or refractory compound or compounds containing one or more of the fissile elements such as uranium, thorium, and plutonium. Of particular interest are the oxides and carbides of these elements, and uranium dioxide is frequently used. The uranium dioxide usually is compressed and sintered from a powdered form into a dense compact to the extent that approximately 90 to 96% of theoretical density is achieved. The ceramic compacts then are inserted into a protective sheath or cladding tube formed from stainless steel or zirconium or other suitable material from a nuclear engineering standpoint. The cladding tube desirably is thin-walled to minimize parasitic neutronic absorption and to promote heat transfer and can be in the neighborhood of 6 to 9 feet in length, depending upon the size of the reactor core. Additionally, the cladding tube is hermetically sealed at its end after insertion of the ceramic compacts and desirably has the same cross-sectional configuration as that of the compacts, which in this exemplification of the invention, is circular.

Figures 1, 2, 3, 4, 5:
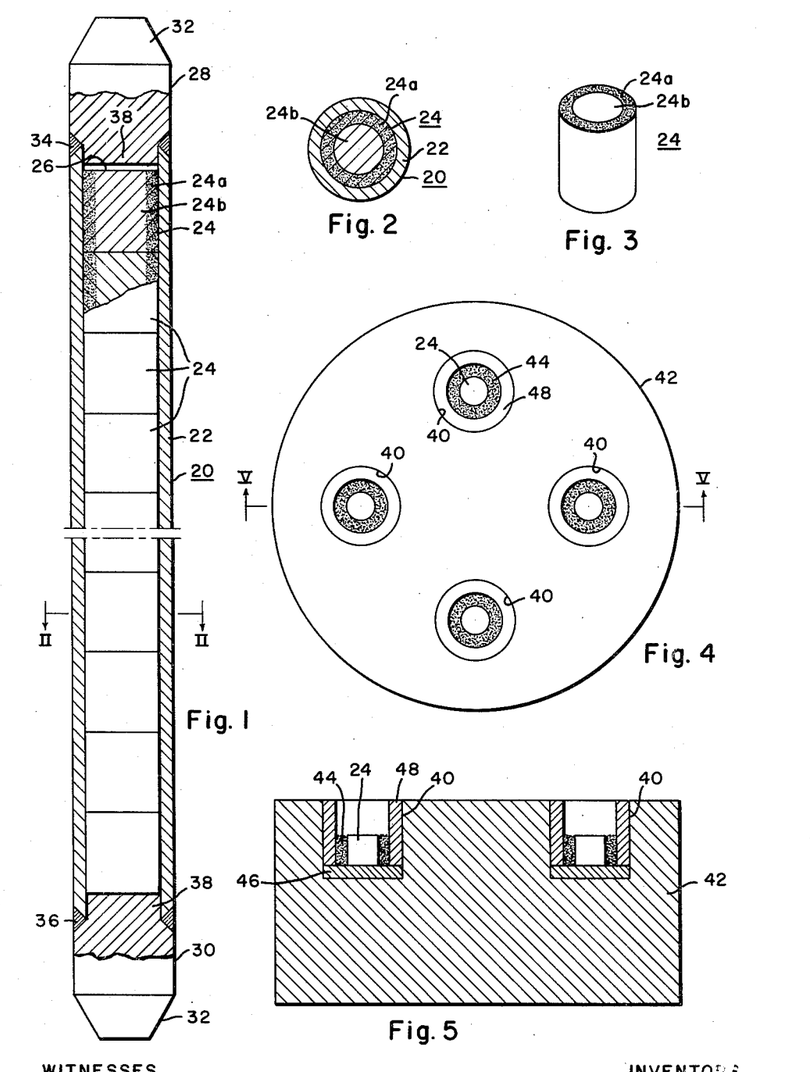
FIGURE 1 is an elevational view partially sectioned of a rod type fuel element constructed in accordance with the invention.
FIGURE 2 is a cross-sectional view of the fuel element shown in FIGURE 1 and taken along the reference line II—II thereof.
FIGURE 3 is a top-and-side isometric view of one of the generally cylindrical members shown in FIGURE 1.
FIGURE 4 is a top plan view of an exemplary mold employed in the fabrication of the ceramic members illustrated in FIGURES 1 to 3.
FIGURE 5 is a cross-sectional view of the mold illustrated in FIGURE 4 and taken along reference line V—V thereof.

One such fuel element is illustrated in FIGURES 1 and 2 of the drawings. In this arrangement, a fuel element 20 includes a sheath or cladding tube 22 of circular configuration as illustrated in FIG. 2. The cladding tube 22 is substantially filled with a tandem series of ceramic $UO_2$ compacts 24. The compacts 24 are of right cylindrical configuration of a size such that the cylindrical surface is closely fitted into the cladding tube 22. Of course the cladding tube and the compact can be formed of any desired cross-sectional configuration. As a result of the present state of technology, the compacts 24 are formed with a height or length not considerably greater than their diameter in order to facilitate compressing and sintering the compacts 24 to the desired density.

The compacts 24 are furnished with a slightly smaller diameter than the inside diameter of the cladding tube 22, so that 2 to 4 mils clearance exists therebetween. This clearance (not shown) facilitates insertion of the compacts 24 into the cladding tube 22 and also permits relative longitudinal thermal expansion of each compact 24 relative to the cladding tube 22 during operation of the reactor. The differential thermal expansion results from the fact that the central temperatures of the compacts 24 are in the neighborhood of 2750° C. while the outer surface temperature of the cladding tube 22 is about 600° F. To accommodate this differential longitudinal expansion, a space 26 generally is left at one end of the fuel element 20.

The ends of the cladding tube 22 are closed respectively by end plugs 28 and 30, the free ends of which desirably are tapered as denoted by the reference numerals 32, in order to reduce fluid resistance in the reactor coolant stream usually flowing longitudinally of the fuel element 20. Further, the end plugs 28 and 30 are hermetically sealed to the associated ends of the cladding tube 22 by means of annular sealing welds 34 and 36, respectively. To facilitate joining to the associated ends of the cladding tube 22 each plug 28 or 30 is provided with a reduced portion 38 which is inserted into the cladding tube.

Heretofore, it has been the practice to fabricate the compacts 24 in a manner such that the resultant ceramic form of the $UO_2$ approaches its theoretical density as closely as practical. This result has been desired in order to improve the conductivity of the $UO_2$ compact, which is not a particularly good heat conductor even in the state of theoretical density.

However, when considering the operating, radial temperature gradient of each compact 24, it is found that heat is transferred pimarily by the conductional phenomenon only in the outer radial area, for example in the area of the outer radial one-third of the compact 24, or in the annular region denoted by 24a of FIGS. 1 to 3. In the interior regions of the compact 24, that is to say the area designated by 24b of FIGS. 1 to 3, heat is transferred primarily by radiation. As is well known, the rate of heat transfer by radiation is a function of the absolute temperature raised to its fourth power and thus becomes technologically interesting in the temperature range above 1000° C. In the area 24b of the compact 24, it will presently be shown that the operating temperatures are considerably in excess of 1000° C.

It is therefore not desirable that porosity be eliminated from the central region 24b of the compact 24, inasmuch as the presence of a porous structure makes possible the transfer of heat by radiation through the central region 24b. The maximum porosity of the area 24b, however, is dictated by well known reactor engineering considerations of fuel loading and power density. On the other hand, porosity should not be eliminated from this area nor should this area be theoretically dense so as not to hamper heat transfer by radiational phenomenon. This is an additional reason why previously proposed solutions to the problem of increasing heat conduction of the compact 24 are not feasible or practical. As pointed out previously, such proposals involved completely filling the porous structure of the compacts 24 with the result that transfer of heat by radiation in the region 24b was greatly reduced or eliminated altogether.

In conventional ceramic $UO_2$ compact, having in this example a uniform porosity of 10%, the following conditions have been found:

TABLE I

| $r$, in. | $c/K_t$, °C./in.² | $dT/dr$, °C./in. | $T$, °C. |
|---|---|---|---|
| 0 | 3.82×10⁵ | 0 | 2,750 |
| .05 | 3.82×10⁵ | −9,550 | 2,512 |
| .10 | 3.82×10⁵ | −19,100 | 1,795 |
| .15 | 3.82×10⁵ | −28,650 | 600 | where:

$r$=distance from the center of a compact having a diameter of .3 inch,
$c$=energy generation per unit volume,
$K_t$=total thermal conductivity of the material,
$T$=temperature, and
$dT/dr$=the temperature gradient.

Although such compacts have been employed satisfactorily in certain instances, the severe temperature gradients existing over the relatively small radius of the compact frequently result in radial cracks with attendant undesired release of fissional products from the compacts. Moreover, these cracks and the unequal expansions within the individual compacts frequently result in bulging and obstruction of coolant flow through the individual fuel element assemblies of the reactor. An added disadvantage of compacts made according to conventional processes is the limitation upon the diameter of the compacts imposed by the severe temperature gradients.

Pursuant to the principles of the invention, these ceramic compacts are fabricated such that their operating temperature gradients are much less severe while still affording adequate heat transfer. More specifically, means are associated with the compact in accordance with the method of the invention for reducing or eliminating the porosity of the compact in its outer area designated by 24a (FIGS. 1 to 3) and thereby for increasing the thermal conductivity of this area. On the other hand, such means are arranged so that the porosity of the central area 24b of the compact is preserved or increased in order to facilitate transfer of heat therethrough by thermal radiation.

According to one aspect of the invention the area 24a is infiltrated with a metal having a relatively high thermal conductivity and the requisite nuclear characteristics, specifically a relatively low neutronic absorption cross section. Examples of such metals, together with their pertinent properties are tabulated below:

TABLE II

*Thermal and nuclear properties of exemplary metals useful as infiltrants*

| Element | Melting Point (° C.) | Thermal Conductivity at 20° C. (cal./sec. cm. ° C.) | Thermal Neutron Absorption Cross Sections at 20° C. | |
|---|---|---|---|---|
| | | | Microscopic (barns) | Macroscopic (cm.⁻¹) |
| Aluminum | 600 | 0.50 | 0.21 | .013 |
| Silicon | 1,430 | 0.20 | 0.13 | .0065 |
| Iron | 1,539 | 0.18 | 2.40 | .20 |
| Titanium | 1,690 | 0.41 | 5.60 | .32 |
| Zirconium | 1,845 | 0.06 | 0.18 | .0077 |
| Molybdenum | 2,622 | 0.32 | 2.40 | .15 |

In this exemplification of the invention, silicon has been selected as the infiltrating metal due to its lower absorption cross section and to its adequately high melting point and thermal conductivity. Aluminum, of course, would be desirable in those applications where the surface temperatures of the compact 24 are lower or where the desired radial dimension of the area 24a is less. It will be seen readily however as this description proceeds that the process of the invention can be adapted to employ any of the metals listed in Table II, or other suitable materials having the requisites of relatively high melting point, good thermal conductivity, and relatively low thermal neutronic absorption cross sections.

Another advantage in the selection of silicon for the infiltrant is apparent when considering the nuclear properties of the various silicon isotopes as set forth in the following table:

TABLE III

| Isotope | Natural Abundance (percent) | Thermal Neutron Absorption Cross Section (Barns) | Half life | Decay Product | Neutron Absorption Product |
|---|---|---|---|---|---|
| Si²⁸ | 92.17 | 0.1 | Stable | None | Si²⁹ |
| Si²⁹ | 4.71 | 0.3 | Stable | None | Si³⁰ |
| Si³⁰ | 3.12 | 0.11 | Stable | None | Si³¹ |
| Si³¹ | | | 2.62 Hrs | P³¹ | Si³² |
| Si³² | | | 300 Yrs | P³² | |

From the foregoing table, it will be seen that only slightly more than 3% (Si³⁰) of the silicon is likely to be converted to a radioactive product through neutron-absorption inasmuch as it is statistically improbable that atoms of the Si²⁸ and Si²⁹ isotopes will absorb more than one neutron, if any. It should be noted, however, that the thermal neutronic absorption cross-section of the isotope involved (Si³⁰) is only 0.11 barn.

To initaite the process of the invention, pulverulent silicon is employed, in this example, comprising 97.7% silicon and impurities of .8% iron, .5% aluminum, and trace amounts of manganese, titanium, chromium, carbon, phosphorus and sulphur. A screen analysis of the silicon powder indicated that a minimum of 99% of the material would pass through a number 100 sieve (149 microns) and a minimum of 80% would pass through the number 200 sieve (74 microns).

Figure 6:
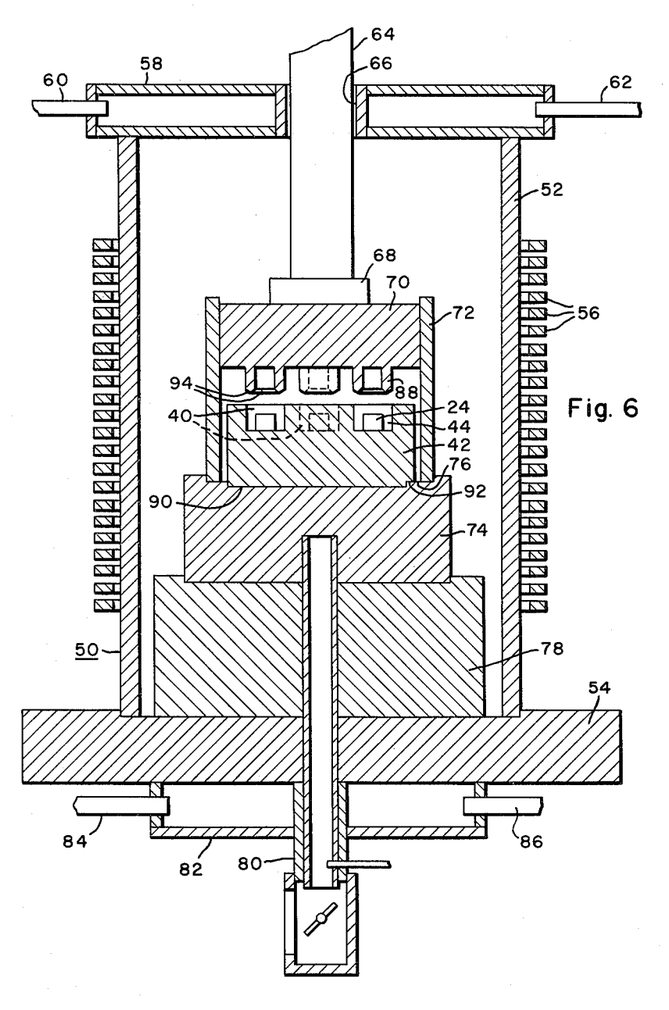
FIGURE 6 is a cross-sectional view of an exemplary inductively heated hot press employed in fabricating the ceramic members of FIGURES 1 to 3.

FIGURES 4 to 6 illustrate one form of apparatus which can be employed and some of the steps utilized in carrying out the invention. In this aspect of the invention, four of the compacts 24 are inserted respectively, as better shown in FIG. 4, into recesses 40 in a graphite mold 42, in this example, of cylindrical configuration.

To prevent chemical reaction of the silicon powder designated by the reference numeral 44, with the body of the mold 42, each of the recesses 40 is lined with a graphite disc 46 overlying its bottom wall and a tubular graphite insert 48 covering the cylindrical wall of the recess 40. The discs 46 and the inserts 48 are of course expendable and are replaced periodically due to reaction of the silicon powder therewith. The discs 46 and the inserts 48 of course prevent contact of the adjacent portions of the mold 42 with the silicon powder 44.

In this arrangement of the invention where, as pointed out previously, the diameter of each compact 24 is approximately .3 of an inch, the inside diameter of the insert 48 is about one-half inch while the thicknesses of the insert 48 and the disc 46 are one-eighth inch. Accordingly, the dimensions of the recesses 40 are ¾ x ¾ inch. As shown in FIGS. 4 and 5, the annular areas between the outer cylindrical surfaces of the compacts 24 and the inner surfaces of the inserts 48 are filled with silicon powder 44. In the exemplary application of the compacts 24, as illustrated in FIG. 1, only an annular portion 24a adjacent the outer cylindrical surface of the compacts 24 need be infiltrated. Thus the top and bottom planar surfaces of the compacts need not be so treated inasmuch as the compacts are supported in a tandem array with these surfaces in abutting relation. Although these surfaces can be infiltrated if desired, it is preferable to reduce the amount of metal added to the compacts 24 for this application by preventing the powdered silicon from contacting these planar surfaces. This is accomplished by placing the lower end of the compact 24 in contact with the upper surface of the disc 46 and by controlling the height of the annular portion of silicon powder 44, such that the same does not flow inwardly over the upper end surface of the compact 24.

When the compacts 24 are thus assembled in the mold 42, the latter, in this example, is placed in an induction hot press denoted generally by the reference character 50 and illustrated iin FIG. 6. The press 50 comprises a silica insulating tube 52 supported upon a pressure block 54 fabricated from a non-magnetic steel. An induction coil 56 is placed around the silica tube 52, and the upper end of the tube supports a water-cooled head 58 of hollow annular configuration. The head 58 is cooled by circulating water through the inlet and outlet conduits 60 and 62 thereof.

A push rod 64 is inserted through a central opening 66 of the water-cooled head 58 and is movable upwardly and downwardly as viewed in FIGURE 6 by suitable and known actuating means (not shown). The push rod 64 is fabricated from a high temperature alloy, for example, an alloy sold under the trademark "Discaloy" by Westinghouse Electric Corporation and comprising 24–28% nickel, 12–15% chromium, 2½–3½% molybdenum, together with minor and trace amounts of titanium, silicon, manganese, cobalt, aluminum, carbon; composition balance iron. The push rod 64 is closely fitted within the opening 66 so that it is cooled during operation of the press by the head 58. The inner or lower end of the push rod 64 terminates in a flange element 68 which, in turn, is secured to a cylindrically shaped piston member 70 fabricated from carbon. The piston 70 is arranged for movement within a graphite sleeve 72, which rests upon a graphite conducting block 74 and is centered thereon by means of a circular recess 76.

Because the graphite block 74 and the graphite sleeve 72 are electrical conductors, heat is induced therein by the coil 56 and is transferred therefrom to the mold 42 resting on the block 74 and thus added heat is supplied to the mold in addition to that which is induced directly therein. Moreover, the block 74 and sleeve 72 serve as heat shields to minimize transfer or loss of heat from the mold 42. The block 74 and associated components are mounted upon a carbon insulator 78, which is provided to minimize the flow of heat from the block 74 to the metallic pressure block 54. A pyrometer sight tube assembly 80 is inserted through aligned openings in a lower water-cooled head 82 and in the pressure block 54, the insulator 78 and the graphite block 74 for the purpose of determining the temperature within the induction press. The lower water cooled head 82 prevents overheating of the pressure block 54. Water is circulated through the head 82 by means of inlet and outlet conduits 84 and 86.

As noted previously, when the mold 42 is placed within the graphite sleeve 72 and the coil 56 is connected to a suitable source of electric potential (not shown), sufficient heat is induced in the mold 42 and in the graphite conductor 74 to cause the silicon powder 44 to melt and to infiltrate pores of the compacts 24 contained within the mold 42. In order to afford adequate heat generation in the mold 42, the latter in this example is fabricated with a height of approximately 2 inches while the recesses 40 are formed therein on a circle having a diameter of about 2¼ inches. To increase the infiltrational speed and depth, pressure desirably is applied to the molten or partially molten silicon powder 44 while heating the same. This is accomplished by providing the piston element 70 with a plurality of annularly shaped punches 88, which are aligned respectively with the annular areas occupied by the melting silicon in the recesses 40. The punches 88 are designed to fit closely into the annular space between the compacts 24 and the associated tubular inserts 48 respectively so that pressure can be applied to the silicon to aid in causing the latter to flow into the areas 24a of the compacts 24. Axial alignment of the mold 42 relative to the piston member 70 is ensured by insertion of the mold 42 into a circular recess 90 formed in the graphite block 74. Additionally, rotational alignment of the recesses 40 with their corresponding punches 88 is maintained by means of a slot and key arrangement denoted generally by the reference character 92 formed at the junction between the mold 42 and the graphite block 74.

To prevent chipping of the compacts 24 and the graphite inserts 48, the inner and outer lower edges of each punch 88 desirably are chamfered as denoted by reference characters 94. In addition, chamfering the inner edge of the punches 88 aids in centering the compacts 24 relative to their corresponding recesses 40 and in addition causes molten silicon to flow upwardly into the wedge-shaped area between the compact and the inner chamfer of the punch so that the molten silicon can reach the entire cylindrical surface of the compact. In furtherance of this purpose, the chamfer at the inner edge of each punch can be made greater than that of the outer edge. With this arrangement, the compacts 24 desirably are infiltrated to a depth corresponding to the shaded areas 24a of FIGS. 1 to 3. It is to be understood, of course, that use of the punches 88 is not essential to practicing the invention, where less infiltrational speed and penetration are desired or can be tolerated.

The following Table IV illustrates the improved operating conditions attained when the compacts 24 of the fuel element 20 in FIGURE 1 have been treated in accordance with this aspect of the invention. In this arrangement the compacts 24 are fabricated from $UO_2$ and are compressed and sintered to the density of 90% and thus are identical to the compacts whose operating characteristics are tabulated in Table I.

TABLE IV

| $r$, in. | $c/K_t$, ° C./in.² | $dT/dr$, ° C./in. | $T$, ° C. |
|---|---|---|---|
| 0 | 3.82×10⁵ | 0 | 2,152 |
| .05 | 3.82×10⁵ | −9,550 | 1,913 |
| .10 | 3.82×10⁵ | −19,100 | 1,197 |
| .10 | 1.91×10⁵ | −9,550 | 1,197 |
| .15 | 1.91×10⁵ | −14,320 | 600 | where the symbols $r$, $c$, $K_t$ and $dT/dr$ have the same definitions as in Table I. In the compact used for Table IV, the diameter is .3 inch and the outer radial ⅓ of the compact has been infiltrated with 10%, by volume, of silicon. In the compacts employed in the reactor applications as illustrated by Tables I and IV, respectively, the heat output and the surface temperature of each compact are substantially identical. Thus the lower central temperature and thermal gradient of the infiltrated compact is attributed solely to the improved thermal conduction property imparted to the outer radial one-third of the compact by the infiltrant metal.

Figures 7, 8:
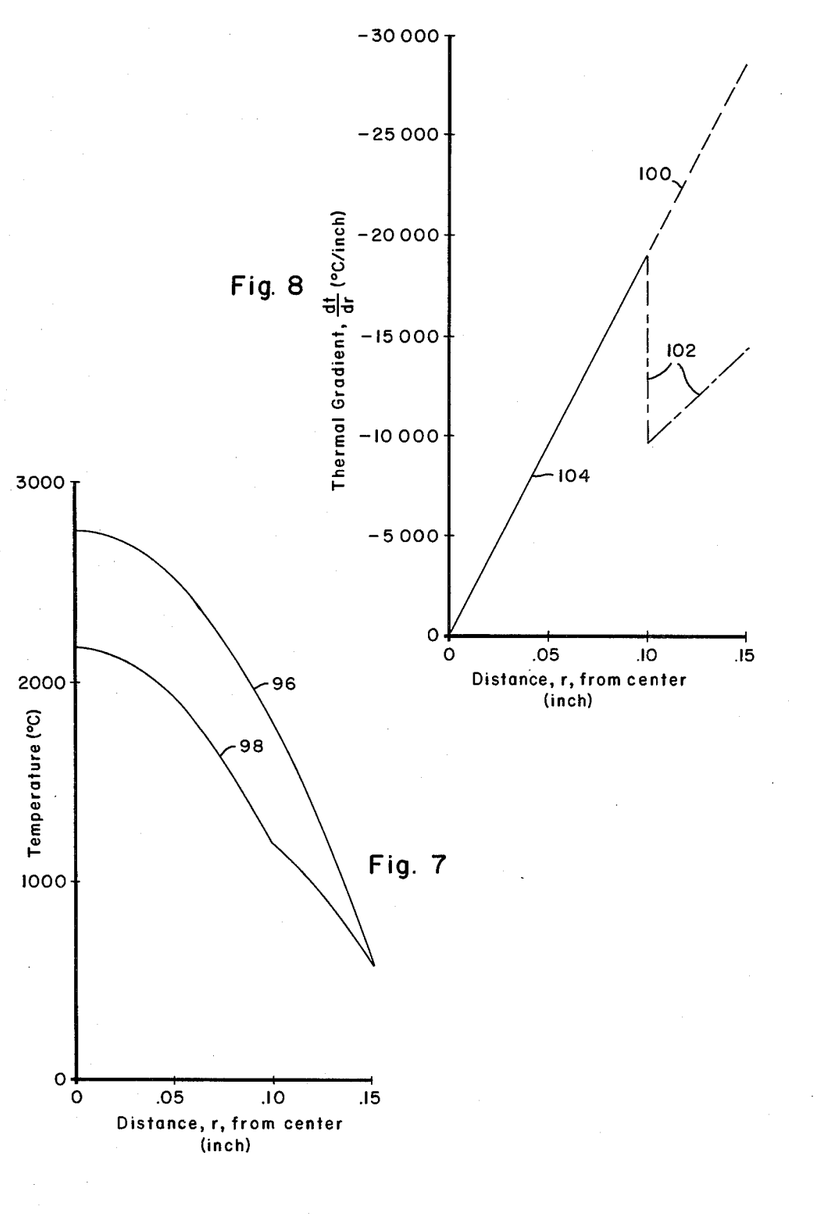
FIGURE 7 is a graphical comparison between internal temperatures of ceramic members fabricated in accordance with the invention and of similar, untreated ceramic members.
FIGURE 8 is a graphical comparison of operating thermal gradients of the ceramic members fabricated in accordance with the invention and of similarly shaped but untreated ceramic members.

In FIGURE 7 a graphical comparison between infiltrated and non-infiltrated compacts is seen. Curve 96 represents the temperature conditions in an unfiltrated compact while curve 98 describes similar conditions in an infiltrated pellet made in accordance with the invention. The data employed in constructing FIGURE 7 are obtained from pertinent portions of Tables I and IV.

Similarly, FIGURE 8 is a graphical comparison of appropriate data from Tables I and IV relating to the thermal gradients of uninfiltrated and infiltrated compacts. Thus curve 100 represents the radial variation in thermal gradients across an uninfiltrated compact while curve 102 represents the thermal gradients in an infiltrated compact. The solid line portion 104 of the curves 100 and 102 illustrates, of course, that the central or uninfiltrated portion of the infiltrated compact is similar in behavior to the untreated compact.

It has been found that the normal definition of infiltration, i.e., filling the voids of a porous body, does not strictly apply to the process contemplated by the invention. For example, it has been shown by experiments dealing with ceramic $UO_2$ compacts having a density of 93% theoretical, or a maximum porosity of 7%, that the volume percent of infiltrant silicon adjacent the cylindrical surface of the compacts varies between 0 and 30%, depending upon the infiltrating times and temperatures employed.

Figure 9:
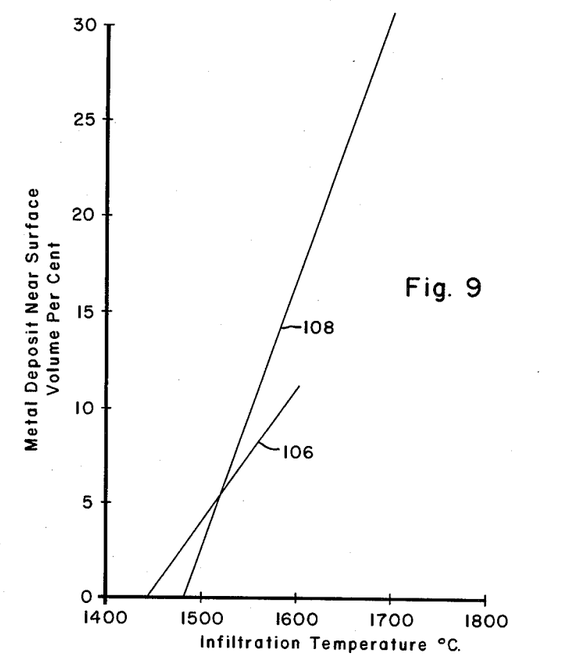
FIG. 9 is a graphical illustration of the effects of heating times in carrying out the process of the invention.

The variation of the infiltrating deposit near the surface of the compact with time and temperature is illustrated graphically in FIGURE 9. In this figure, curve 106 represents the approximate variation of the metal deposit with temperature at a constant holding time of 30 minutes, while curve 108 similarly represents such variation at a constant holding time of 45 minutes. The results obtained with a holding time in the range of 15 to 16 minutes at similar temperatures were somewhat erratic—sometimes resulting in adequate infiltration and sometimes not. Under the conditions described herein, then, 15 minutes would appear to be the minimum holding time in the case of silicon infiltrant while 1500° C. would appear to be the corresponding minimum temperature.

Unexpectedly, it has also been found that the compacts 24 experience weight losses during the infiltration process according to the invention instead of an anticipated weight gain. In the light of the present understanding of the invention, the filling of pores or voids in the ceramic compacts apparently is not the only mechanism involved inasmuch if such were the case the compact would exhibit a weight gain equal to the amount of silicon deposited. However, in every instance of application of the process of the invention, the compacts 24 have experienced weight losses. These weight losses appear to vary directly with the holding time at the given infiltrational temperatures and with the amount of infiltrant added to the compact.

Figure 10:
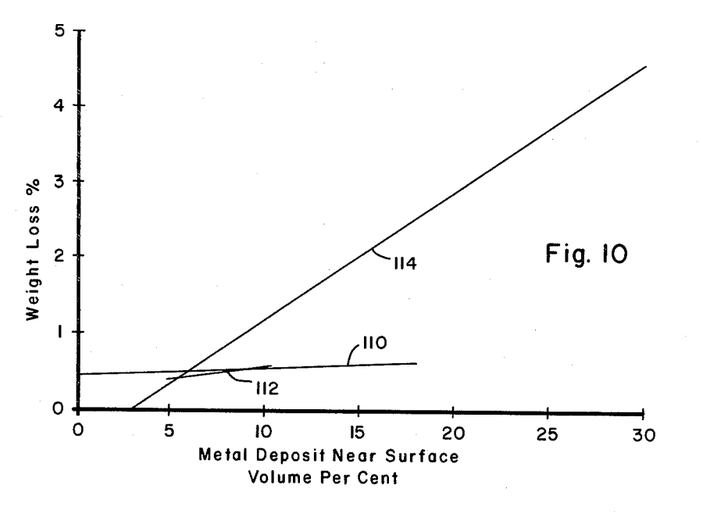
FIG. 10 is a graphical illustration of the relation of heating times to weight loss of the treated ceramic members.

This relationship is represented graphically in FIGURE 10 wherein curve 110 indicates weight loss of various compacts processed with a constant holding time of 15 minutes and curves 112 and 114 refer to similar processes at constant holding times of 30 and 45 minutes, respectively.

The observed excessive metal concentration and the weight changes may be qualitatively explained by assuming a reaction which removes oxygen from some of the $UO_2$ ceramic. The volume originally occupied by the $UO_2$ thus decomposed may then be filled with uranium, silicon and uranium silicides. The phases actually present as a result of the infiltrating process of the invention are not presently known. Although there may be some little understood reaction between the silicon and the uranium under the conditions dictated by the present infiltrational process, such reaction will not occur during operation of the compacts within a reactor since the outer or infiltrated region of the compacts operates at a much lower temperature, as previously pointed out in connection with Tables I and II. In view of the foregoing unexpected phenomena, the term "infiltration" is redefined for purposes of this description to include reaction with or displacement of the native material of the ceramic compact or other body by the infiltrant material, in addition to filling the pores or voids thereof.

Figure 11:
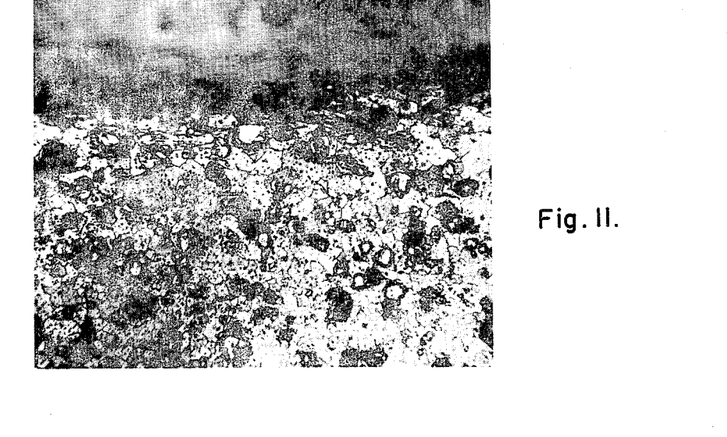
FIGURE 11 is a photomicrograph of a surface region of a ceramic member fabricated in accordance with the invention.

With reference now to FIGURE 11 of the drawings, a photomicrograph is shown of the surface region of a compact which has been infiltrated to 9 volume percent of silicon adjacent its cylindrical surface. In this example, the infiltrant penetrated to a depth of 0.042 inch. The bright areas of the photomicrograph with the heavy black boundaries are the silicon deposits.

Figure 12:
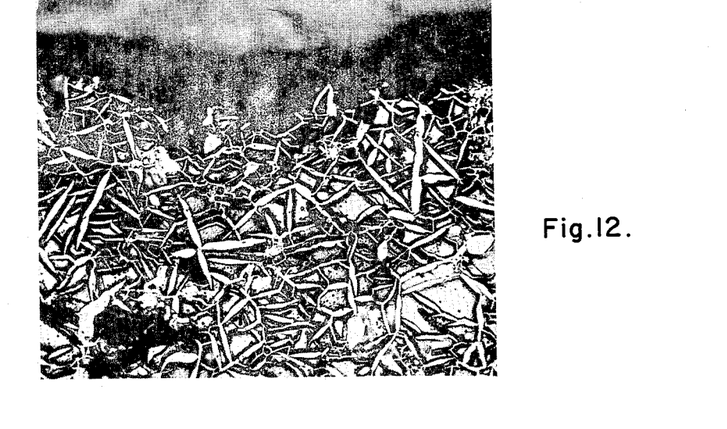
FIGURE 12 is a photomicrograph of another ceramic member fabricated in accordance with the invention.

FIGURE 12 is a photomicrograph representing the phasal changes in a compact which has been infiltrated to the extent of 30 volume percent adjacent its cylindrical surface. In this case the infiltrant penetrated to a depth of .136 inch. In this example, the metallic phase including the infiltrant silicon appears as an interconnected network.

From the foregoing, it will appear that by utilizing the principles of the invention the outer regions of ceramic compact can be infiltrated to almost any desired depth and concentration of the infiltrant. Thus the ceramic compacts employed in a given reactor can be tailored readily to suit the desired operating characteristics of the reactor. Moreover, the presence of the infiltrating metal in the outer radial regions of the compact will tend to concentrate the fissional product within the central porous region of the compact thereby inhibiting their release from the fuel element 20 in the event of rupture or leakage of the cladding tube 22. Additionally, infiltrant metal at the cylindrical surfaces of the compacts 24 will reduce friction and minimize scoring of the inner wall of the cladding tube 22 during assembly and operation of the fuel element 20.

Furthermore, FIGURE 12 illustrates that infiltration as defined herein can take place in substantially non-porous, ceramic or refractory compounds of the fissile elements. Although the use of a non-porous material would be less advantageous, nevertheless certain features of the invention are preserved in infiltrating in accordance with the invention a substantially non-porous member fabricated from a refractory compound of a fissile material. Inasmuch as the conductive infiltrant is confined to the outer regions of the non-porous member certain advantages of the invention are achieved. Thus parasitic conductive material is eliminated from the central region, and only that quantity of conductive infiltrant, i.e., in the outer regions, is utilized which has beneficial influence upon the heat-conductive properties of the non-porous member. Moreover, FIG. 12 further indicates that an interconnected phasal network is formed irrespective of porosity, and, of course, the desirability of eliminating infiltrant from the central region to avoid melting and formation of compounds has been discussed previously. Additionally, the confinement of fissional products and the prevention of scoring the inner surfaces of the cladding tube are evident in this latter arrangement.

In accordance with another aspect of the invention, the compacts 24 are provided with a radial density gradient such that the density of the ceramic material adjacent the cylindrical axis of the compact is less than the density adjacent the cylindrical surface of the compact. In one arrangement for attaining this purpose, the outer region of the compact 24, corresponding to the area 24a of FIGS. 1 to 3, is quick-sintered or fused at an elevated temperature to decrease or eliminate the porosity of the $UO_2$ ceramic occupying the region 24a without materially decreasing the porosity of the central region 24b. With this arrangement, the ability of the central porous material to transfer heat by radiation is not impaired while the thermal conductivity of the $UO_2$ ceramic in the outer region 24a is much improved, due to the decreased porosity. Although the improvement is not as substantial as that attained with the infiltrant metal such as silicon, the latter arrangement of the invention has the advantage that additional material is not introduced into the fuel element.

It is apparent from the examples given that many different components can be utilized in the manufacture of nuclear fuel compacts in accordance with the invention. For example, other oxides of any of the fissile materials, thorium, uranium and plutonium can be employed and also other chemical compounds thereof such as the carbides. For use in the invention, the essential characteristics of the fissile material are the exhibition of requisite nuclear properties, a relatively lower heat conductivity, and the capability of infiltration by a material of relatively higher heat conductivity. New alloys and other conductive or semiconductive materials are constantly being developed and made commercially available, many of which undoubtedly will be found adaptable as suitable infiltrants for the compact or similar form of fissile material. It is therefore not only impossible to attempt a comprehensive catalogue of useful components but to attempt to apprehend or to describe the invention in its broader aspects in terms of the chemical names of the possible components would be misleading. The invention lies in the physical relation or mechanical correlation of the various types of components contemplated by the invention, and their individual composition is important only in the sense that the individual properties of the parts of any mechanical assemblage are important to the proper combination and coaction.

To formulate a set of specifications for a composition, ceramic compact, or other fuel material in the light of the present disclosure will call for the application of nuclear engineering skill. The office of the nuclear engineer will be like that of the mechanical engineer who prescribes, in the construction of a machine, the proper material and the proper dimensions therefor. From his knowledge as a nuclear engineer of the materials available, he will know or deduce with confidence their applicability to the purposes of the invention or, otherwise, and in the case of novel material, routine tests not of an inventive nature will provide reliable data.

In analogy to the case of the machine wherein the use of certain materials of construction or dimensions of parts would lead to no practically useful results, various materials will be rejected as inapplicable while others operative as such and illustrative of the theoretical basis of the invention may not be practically useful because the significant temperatures or ranges of temperatures involved would not be particularly advantageous or find a particular application in the practical arts or because of considerations of costs of the materials, etc. It may be safely assumed that no one will wish to make a useless composition or fuel element or will be misled because it is possible to misapply the teachings of the present disclosure in order to do so.

From the foregoing it will be apparent that novel and efficient forms of a fuel element and a ceramic compact for use therein and processes and apparatus for making the same have been disclosed herein. Numerous modifications of the invention will occur to those skilled in the art without departing from the spirit and scope of the invention. It is also to be understood that certain features of the invention can be employed without a corresponding use of other features thereof.

Accordingly, what is claimed as new is:

1. A member fabricated from a fissile material and adapted for use in a nuclear fuel element, said member being characterized in that the central region thereof is a porous structure while the outer region thereof is infiltrated with a material having a substantially higher heat conductivity and a substantially lower melting point than that of said fissile material and also having a relatively low thermal neutronic absorption cross section.

2. A member fabricated from a fissile material and adapted for use in a nuclear fuel element, said member being characterized in that the central region thereof is a porous structure while the outer region thereof is infiltrated with a metal selected from the group consisting of aluminum, silicon, iron, titanium, zirconium and molybdenum.

3. A member fabricated from a fissile material and adapted for use in a nuclear fuel element, said member being characterized in that the central region thereof is a porous structure while the outer region is infiltrated with silicon metal.

4. A member fabricated from a fissile material and adapted for use in a nuclear fuel element, said member being characterized in that its central region is a porous structure while approximately the outer radial one-third of its volume is infiltrated with a metal selected from the group consisting of aluminum, silicon, iron, titanium, zirconium and molybdenum.

5. A fuel element for a nuclear reactor, said fuel element comprising an elongated cladding tube, a plurality of porous members inserted in tandem into said tube and substantially filling said tube, each of said members having a porous central region with the outer region thereof being infiltrated with a metal selected from the group consisting of aluminum, silicon, iron, titanium, zirconium and molybdenum, and means for closing and sealing the ends of said tubes.

References Cited by the Examiner
UNITED STATES PATENTS

| | | | |
|---|---|---|---|
| 2,848,352 | 8/58 | Noland et al. | 117—65 |
| 2,853,446 | 9/58 | Abbott et al. | 176—68 |
| 2,863,814 | 12/58 | Kesselring et al. | 176—82 |
| 2,894,320 | 7/59 | Gurinsky et al. | 176—82 |
| 2,894,889 | 7/59 | Paine | 176—82 |

FOREIGN PATENTS 788,926  1/58  Great Britain.

OTHER REFERENCES

Glatter et al.: PWR Blanket Fuel Elements, 2d United Nations International Conference on the Peaceful Uses of Atomic Energy, vol. 6, 1958, p. 639 relied upon.

Hausner et al.: $UO_2$ for Fuel Elements, Nucleonics, July 1957, p. 102 relied upon.

Hausner et al.: Nuclear Fuel Elements, published by Reinhold Publishing Corp., November 1959, p. 188 relied upon.

Weber et al.: Dispersion Type Fuel Elements, Progress in Nuclear Energy, Series V, Metall. & Fuels, vol. I, 1956, pp. 523 and 529 relied upon.

REUBEN EPSTEIN, *Primary Examiner.*

CARL D. QUARFORTH, OSCAR R. VERTIZ, ROGER L. CAMPBELL, WILLIAM G. WILES, *Examiners.*